United States Patent Office 3,396,403
Patented Aug. 6, 1968

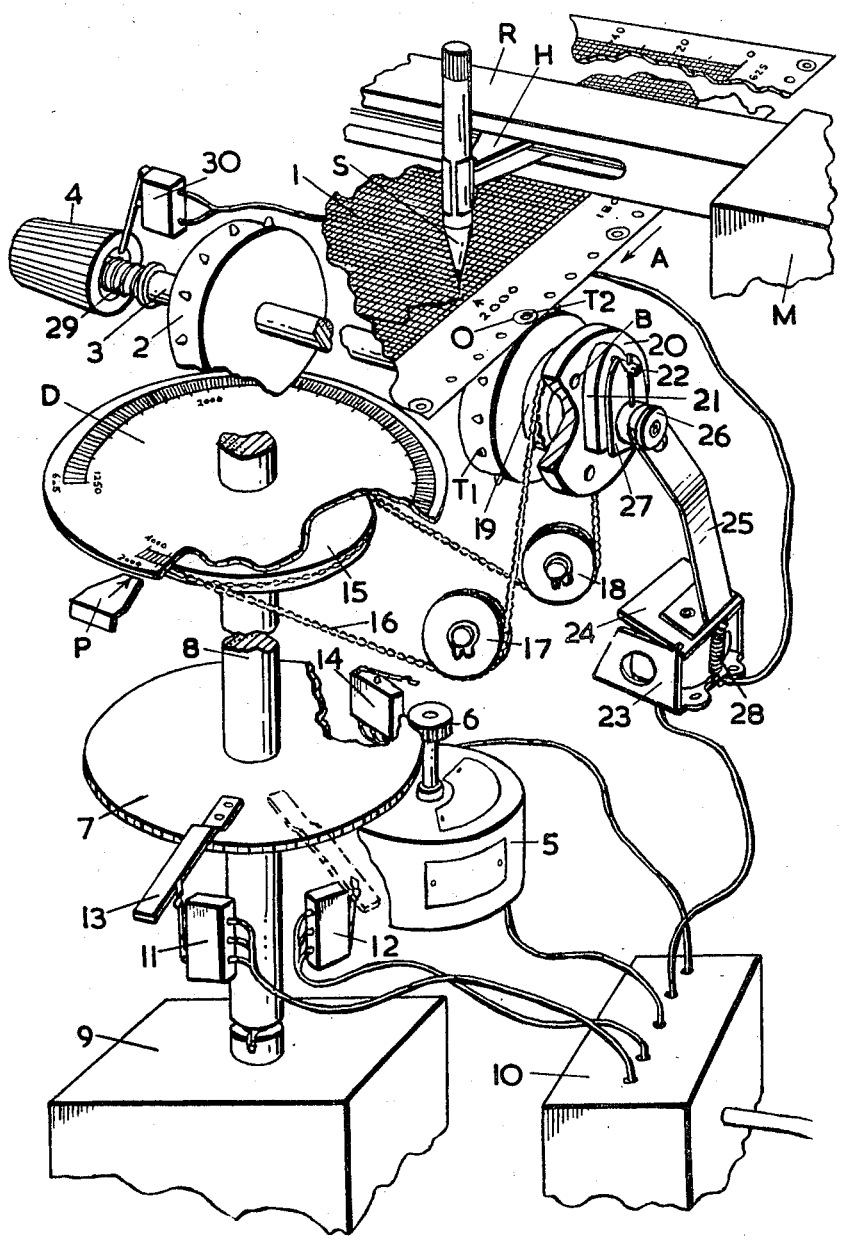

3,396,403
SYNCHRONIZED CHART RECORDER
Michael Alan Ford, Slough, and Samuel Francis Desmond Orr, Beaconsfield, England, assignors to Perkin-Elmer Limited, Beaconsfield, England, a British company
Filed Nov. 29, 1966, Ser. No. 597,699
Claims priority, application Great Britain, Nov. 29, 1965, 50,610/65
18 Claims. (Cl. 346—33)

ABSTRACT OF THE DISCLOSURE

The drive connection between the wavelength scan of a spectrophotometer and the driven chart of its recorder includes a releasable coupling means of the dog-clutch type. The coupling may be disconnected either manually or automatically by the instrument so as to allow the scanning drive to be run back to a previous position without moving the chart. The driven and driving parts of the coupling are of a type (a pin which may engage only a small number of specific holes in a disc) that insures reengagement of a coupling will occur at the same "synchronized" relationship between the wavelength scan and the chart. Therefore both repeated, superimposed analyses and interrupted analyses (as when two orders of the same diffraction grating are used for different parts of the recorded spectrum) may be made without loss of the correct relationship between the recording chart and the wavelength scan drive.

---

This invention relates to apparatus including a recording chart support and a marking device adapted to cooperate so as to enable a dependent variable to be recorded as a function of an independent variable in the form of a visible trace upon the chart, movement of either the support alone or the marking device alone in a first direction representing one variable and movement of the marking device in a second intersecting direction representing the other variable.

Relative motion in the first direction is frequently arranged by causing a marking device mounted on a travelling carriage to be moved along a chart mounted on a stationary support or by causing a driven chart support to move the chart under a stationary marking device, it being understood that whether the marking device is stationary or not relative to said first direction it is in fact always movable in said second intersecting direction.

Our invention is particularly concerned with the manner in which relative motion in said first direction is controlled, and we will generically refer to the movable member and the stationary member to denote is each case the chart support or the marking device, according to whether one or the other is movable in said first direction. The means for actuating the movable member in response to a variable will be broadly identified as the drive means.

In apparatus of the general type referred to, it is sometimes permissible for the movable member to be permanently synchronized with the drive means, e.g., by permanently meshed gearing. There are instances, however, where provision must be included for independent adjustment by allowing the drive to be uncoupled and subsequently recoupled in such manner as to restore accurate synchronization. Our invention is in fact directed to apparatus in which the need exists for a synchronization break followed by accurate restoration thereof.

It is obviously desirable to ensure in such apparatus that repeatable synchronization between the position of the movable member along a path extending in said first direction and the actual value of the variable as may be represented for example by the position of the drive means, e.g., the angular position of a shaft, can be accurately effected without tedious manipulations, regardless of the number of times the drive means is disconnected from the movable member and the two are moved independently.

It is clear from the foregoing that since the chart is a removable element its spatial relationship with the movable member and the stationary member is strictly governed by the manner in which the chart is attached to the chart support. The chart support in apparatus of the type to which this invention relates is provided with means for holding the chart in slip-free relation enabling registration to be maintained while the apparatus is being used and at any future time when it is desired to record in superposition to an existing trace. A known example of such support comprises sprockets cooperating with an accurately perforated chart.

The first synchronization problem is met every time a new chart having a preprinted grid is fitted to the apparatus. It has been hitherto essential for the operator to adjust the positioning of the movable member relative to the stationary member to ensure that the point at which the marking device bears upon the chart corresponds exactly with the value of the variable, which may be read, for example, on a dial connected to the drive.

If a plain chart is used, the same problem is encountered whenever an attempt is made to re-record in superposition to an old trace. Whereas in producing the first trace the operator could mark the datum line himself on the plain chart, on any subsequent re-recording accurate synchronization as in the case of the preprinted grid chart would be called for, otherwise traces would not be recorded in exact superposition.

A further synchronization problem arises where the trace is produced in at least two parts with a synchronization break in between. During the break a changeover may be effected from one to other of two generating means stages for actually generating the variable. Restoration must naturally ensure coincidence between the terminal value of the outgoing generating means stage and the initial value of the incoming generating means stage when the drive means takes up again otherwise the continuation of the trace will suffer a shift and will therefore be inaccurate all along.

A case in point is that of certain spectrophotometers where after producing a first part of the trace up to a predetermined value of a first generating means stage, e.g., a first grating, or a first grating order, a changeover to a second generating means stage takes place while the movable member is kept stationary with the marking device still bearing upon the chart. The take up of the drive must be re-established at a point where the start value of the second generating means stage is identical with said terminal value of the first generating means stage, otherwise the continuation of the trace will exhibit a shift along the scale, i.e., wavenumber or wavelength scale, it being understood that henceforth reference to wavenumber will include the alternative wavelength.

The switch over from one to other generating means stage may be effected through motion derived from the uncoupled drive or by other means.

Hitherto used electro-mechanical links, such as for example of the type involving the cooperation of microswitches and electromagnetic clutches, are apt to develop a phase slip resulting in said shift, because such links lack the positive action provided for example by abutting hard faces in mechanical interference.

A similar problem arises when the ratio between the motion of the drive and that of the movable member must be altered for any reason, e.g., scale expansion. Such alterations must often be made at definite and repeatable value of the variable. This is essential in the case of a spectrophotometer in which recording in superposition must be allowed for.

It is thus clear that with apparatus presently in use the operator may be called upon to perform a lining up operation when the chart is changed and when the synchronization is broken during the operative cycle of the apparatus. The operation is time consuming and indefinite. It often leads to at least a small registration error even in the hands of the expert.

It is obviously a matter of great importance to the user if unequivocal registration at conveniently chosen points can be substituted for the lining up operation referred to.

The object of the present invention is to provide an improved apparatus of the type referred to.

According to one aspect of the invention there is provided an apparatus comprising a support for holding a recording chart in repeatable register, a holder for a marking device for cooperating with said chart in producing a trace thereon, a mechanism for enabling relative movement between said support and said holder in a first direction to represent a first variable, means for displacing said holder in a second intersecting direction to represent a second variable, drive means for actuating said mechanism in response to said first variable, a coupling interposed between said drive means and said mechanism and having a driving and a driven part, the coupling when released enabling independent positional adjustment of the first variable and the mechanism, and including positive mechanical interference means having two cooperating faces, one movable with the driving part and the other movable with the driven part, said coupling being adapted to enable the cooperating faces to be brought almost into interference when said driving and driven parts are almost in a predetermined spatial relationship so that the actual predetermined spatial relationship may be repeatedly established by the abutment of said cooperating faces when brought into actual interference by the take up in the drive with an accuracy limited in the main by the negligible wear in conveniently proportioned cooperating faces.

The apparatus may be arranged so that there are defined through the mechanical interference means a plurality of equally spaced take up positions corresponding to equal discrete displacement of the movable member in said relative movement so that synchronization between the drive means and the movable member may be established and repeated with satisfactory accuracy in correspondence of any take up position.

The mechanical interference means may be controlled through the logic of the apparatus so that it is brought into action in accordance with a programming provided for in the apparatus, said programming enabling travel limits of the movable member to be set between selected take up positions.

A manual overriding control may be provided to enable said positional adjustment by the user and means may be included to denote clearly to the user when re-engagement takes place at a take up position.

According to a more specific aspect of the invention there is provided apparatus comprising sprocket means for advancing a perforated chart in a first direction in response to a first variable, drive means associated with said first variable for rotating said sprocket means, a holder for a marking device intended to cooperate with said chart for the formation of a trace thereon, means for displacing said holder in a second intersecting direction in response to a second variable, a coupling interposed between said drive means and said sprocket means and having a driving and a driven part, the coupling being provided to enable independent positional adjustment of the first variable and the sprocket means when the coupling is disengaged, positive mechanical interference means having two cooperating faces, one movable with the driving part and the other movable with the driven part, said coupling being adapted to enable the cooperating faces to be brought almost into interference when said driving part and said driven part are almost in a predetermined spatial relationship so that the actual predetermined spatial relationship may be repeatedly established by the abutment of said cooperating faces when brought into actual interference by the take up in the drive with an accuracy limited in the main by the negligible wear in conveniently proportioned faces, and programming means enabling interference of the cooperating faces to be prearranged in relation to the value of said first variable.

The provision of definite take up positions where positive coupling of the drive means with the chart advancing mechanism is provided by the mechanical interference device not only means that synchronization restorations as governed by a machine cycle can be phased with high accuracy and stability but it also means that the user may replace the chart in the apparatus any number of times and always be sure of the datum provided it corresponds with one of the take up positions. A wrongly selected take up position is immediately obvious because of the large error introduced, which immediately suggests the correct position.

When incorporated in a spectrophotometer, the invention may be made to restore synchronization between wavenumber scan and chart advancement with a high degree of accuracy, following a synchronization break. A synchronization break would normally occur at the end of a full chart travel corresponding to a full scan travel but it may in addition be made to occur at the end of a partial travel, such as when producing a trace in two stages.

The partial travel may in fact be terminated anywhere between the origin and the end of the full scan travel and synchronization unfailingly restored without the intervention of the user provided the runback travel of the drive is made to correspond to an exact number of take up positions, and provided, of course, the user has not applied overriding menual control, in which case he has no difficulty however in first ensuring that the coupling has engaged at the correct take up position and then allowing the control of the apparatus to take over.

As an alternative to the arrangement in which a runback travel is required at the end of a full or partial scan travel, consecutive wavenumber ranges may be scanned with a synchronization break in between but without runback, the wavenumber scan means being rotated always in one direction. It naturally means that at such break an adequate dead region must be provided during which the necessary changes may be made in the wavenumber scan means, e.g., order changes or grating changes in the case of scan means in the form of one or more gratings.

Since the chart is held stationary in the dead region while the wavenumber scan means is being moved to effect the change operation a definite and constant spatial relationship must be maintained between the break and the restoration of synchronization. This is tantamount to saying that the dead region travel must extend from one take up position to the next, or to any take up positions following, in order to benefit to the full from our invention in the circumstances described.

It is now easy to appreciate that the runback or return travel in the one case is equivalent to the dead region travel in the second. In fact both travels may be regarded as dead region travels if we stipulate that in the dead region the wavenumber scan means is undergoing not a scanning but a changing motion and the chart is held stationary.

Specific reference to our invention as applied to a spectrophotometer has served to illustrate more clearly the broad generalization that whenever a synchronization break is followed by a dead region travel of the drive means said travel must correspond to an exact number of take up position so that when synchronization is restored the movable member in said relative movement representing said first variable through the action of the mechanical interference means, the value of the variable at break being identical with the value at restoration.

The invention will now be described, by way of example only, with reference to the accompanying diagrammatic drawing.

For a clearer understanding of the invention and the range of its applicability, the apparatus depicted in the drawing is assumed to be intended for cooperation with, or incorporation in, a spectrophotometer, since in such instrument a synchronization break between the wavenumber scan drive and the mechanism producing relative motion between recording stylus and chart is introduced where a succession of dispersing elements, which we shall henceforth specify as gratings, are used to cover a wavenumber range that could not be conveniently covered by a single element with or without order change. Resumption of synchronization must be effected with a high degree of accuracy and constancy if the continuation of the trace is to suffer no shift along the wavenumber scale at the points corresponding to a grating change or order change, both in the course of the first recording and—which is far more exacting—on any subsequent superimposed recording, no matter how many times a chart is refitted to the instrument, provided of course it has not suffered mechanical damage, either through wear and tear or careless handling.

In the layout depicted in the drawing, the independent variable (i.e., wavenumber) is represented by the movement of the chart in the direction of the longitudinal axis thereof (denoted by arrow A) relative to a recording stylus S mounted in holder H capable of being reciprocated along rails enclosed at R by a servo-motor enclosed at M which responds to the independent variable (e.g., transmittance). The actual wavenumber value at any instant during a scan can be read on dial D.

In the drawing, a recording chart 1 bearing a preprinted grid is shown in engagement with sprocket 2 of a chart advancing mechanism. The sprockets are keyed to the shaft 3 mounted for rotation in bearings (not shown) and fitted at one end with a knob 4, by manual rotation of which the operator is able to adjust the position of the chart under the stylus.

Drive means including scan motor 5, having pinion 6 engaging spur gear 7 mounted on shaft 8, drives a grating scan mechanism within enclosure 9. The motor is under the control of the programmer 10, which receives limit signals from limit microswitches 11 and 12, interfering at the limit positions of gear 7 with a finger 13 fixed to said gear. Finger 13 has been drawn in full line at one limit position and in broken line at the other limit position.

A further micro-switch 14, also operationally connected with programmer 10, is located so as to be depressed by finger 13 at a suitable angle from the scan start positions at which it is effective when a particular mode of operation is selected. Its function will be presently described.

A pulley 15, keyed to shaft 8, communicates the drive from motor 5, through chain 16 and idlers 17 and 18, to a smaller pulley 19 free to rotate around the shaft 3. A plate 20, integral with pulley 19, forms the driving member of a coupling of which the arm 21, secured at one end to shaft 3, forms the driven member. Arm 21 is provided at its other end with a driving pin 22 slidably mounted in the arm for reciprocating movement towards and away from plate 20, which is provided with three equally spaced peripheral apertures of a size a little in excess of the minimum required to accommodate the driving pin 22 when the latter is urged towards the plate and the plate and the pin are in the correct angular relationship for engagement.

When engaged and driven, the pin abuts under shear loading against the take up side of the engaging aperture and constitutes a positive mechanical interference device providing a definite repeatable spatial relationship of the parts connected by the coupling. Driving pin 22 is urged towards the plate 20 when the electromagnet 23 is energized. In fact, the movement of the armature 24 is then communicated through lever 25 to a collar 26 slidably mounted on shaft 3, and from the collar to the pin 22 through a strip 27, attached to the collar at one end and held captive to the pin at the other. A return spring 28 acting on lever 25 causes an opposite movement urging pin 22 away from the plate 20.

When it is desired to adjust the chart position manually, knob 4 is first pushed forward against the action of spring 29 so as to cause micro-switch 30, in series with electromagnet 23, to break. As a result, the electromagnet 23 will be deenergized, the driving pin 22 released from one of the apertures in plate 20, and the coupling between the scan drive and the chart advancing mechanism interrupted. Rotation of the knob will then permit adjustment of the chart position in either direction.

It is opportune at this stage to consider the fixed relationship between the angular travel of gear 7 and the spatial arrangement and phasing of the apertures in plate 20 defining the definite take up positions of the coupling.

Gear 7 is arranged to reciprocate between two limit angular positions placed some 330 degrees apart. A full scan travel is completed when finger 13 moves from the position shown in full line to the position shown in broken line. This must naturally correspond to a predetermined length of chart advancement. The positioning of microswitches 11 and 12 cooperating through the programmer 10 determines the extent and the timing of a full scan and associated runback.

It must be understood that in the present context "full scan travel" refers to angular displacement of gear 7 between the two identified limit positions in contradistinction with "partial scan travel" wherein gear 7 is reciprocated between two narrower limits, as will be presently explained.

In the layout depicted it is assumed that a first mode of operation enables the wavenumber range 4000–1250 cm.$^{-1}$ to be covered in one full scan travel, without therefore a grating change. In a second mode, the range 4000–625 cm.$^{-1}$ is covered in a partial scan travel up to the 2000 mark, followed by grating change, a runback and a full scan travel up to 625 cm.$^{-1}$, the trace being resumed with the wavenumber value exactly at 2000.

The wavenumbers corresponding to scan travel extremes have been marked on dial D, which is to be read with the aid of reference P.

If all that is desired is to fix unequivocally the correct phasing of the scan drive and the chart advancing mechanism at the scan origin only and no provision for partial scan travel is required, a single take up position in the coupling will suffice. This requires a single aperture in plate 20 (aperture B in the drawing) and in view of the fixed rotational relationship between gear 7 and plate 20 completion of runback must coincide with the single aperture being returned to a fixed angular position.

In fitting a new chart the operator would simply ensure correct registration of the chart with the sprockets, guided by some marking on the sprockets. This naturally assumes that no synchronization break between scan drive and chart advancing mechanism exists while the chart is being fitted. If a break exists, the operator must move the chart to the approximate position corresponding to the scan start and by turning the knob slightly in either direction he can then seek the position where the driving pin 22 is felt to engage the single aperture in plate 20 towards which it is urged at the beginning of a scan by electromagnet 23 being then energized.

Pulley 19 is arranged to complete the angular movement which has been conveniently chosen to correspond to the scan travel. Upon a signal derived from the limit switch 12, electromagnet 23 is de-energized at the end of one scan travel and the chart can thus be held stationary while the scan drive runs back. The electromagnet 23 is reenergized under the control of switch 11 cooperating with programmer 10 so that pin 22 is urged towards plate 20 towards the single aperture of the plate 20 is in a position to allow the pin to engage without fouling the wall of the aperture in a manner presently to be explained in greater detail.

The advantages of the single take up position in ensuring easy setting of the origin on the chart can be further enhanced by increasing the number of take up positions in the coupling. The object of the added positions is to enable recording from the corresponding positions of the chart, where it is not desired to record from the origin. The operator simply adjusts the chart manually to the approximate position required on the chart and then feels for the engagement of the driving pin in the manner described. If the take up positions are not too close together, the operator can never be in any doubt as to the identity of the position at which the chart advancing mechanism has been engaged. The position must either be the one required or it must be so far out as to be immediately obvious to the operator through a glance at the wavenumber dial D which position is the correct one.

Multiple take up positions have a further function where, as in the case of the second of the two modes of operation hereinbefore referred to, it is desired to break the synchronization after a partial scan travel for the puspose of effecting a grating change and a runback followed by a full scan travel. It is only necessary to ensure that partial scan travel takes place between the origin (as set by microswitch 11) and one of the positions intermediate between those in which the full scan travel is exactly comprised.

It is clear from the drawing that the advantages of the multiple take up positions may be substantially realized with a single tape up position provided the sprocket 2, or a more convenient equivalent, is of a comparatively small diameter and the ratio between pulleys 15 and 19 is suitably stepped up. The operational stage depicted in the drawing assumes that after a partial scan travel from 4000 to 2000 cm.$^{-1}$ (consider upper scale of dial) a succession of events initiated by micro-switch 14 took place as a result of which the chart driving mechanism was disengaged through withdrawal of pin 22 so as to leave the chart 1 stationary under the stylus S at the 2000 mark on the chart, the grating was changed (by mechanism not shown) and the runback almost completed.

The position of the dial D relative to the reference P indicates that the 2000 mark on the lower scale is about to be reached, from which the full scan travel to 625 cm.$^{-1}$ will be started. Aperture B is approaching pin 22 and at the moment determined by the position of microswitch 11 electromagnet 23 will be energized to urge pin 22 into engagement with aperture B. At the same time motor 5 will be stopped.

It has been said earlier that the size of the apertures in plate 20 provides a slack fit for pin 22. The positioning of the limit switch 11 is so arranged as to allow the side of the aperture B that will abut against pin 22 during scan, i.e., the take up side, to overshoot slightly the position at which the corresponding take up side of the pin was left when a runback occurred. This ensures that the pin engages either without fouling the wall of the aperture at all or at worst gliding off the edge of the aperture opposite the take up side. At the commencement of the ensuing scan there will be a few degrees of plate movement when the pin will be floating in the aperture with the take up side of the aperture approaching the take up side of the pin. The actual angular position where take up contact between pin and aperture takes place is a fixed datum which can be repeated indefinitely with high accuracy, both at the origin of the full scan travel or at any predetermined intermediate positions. As long as adequate "backlash" is provided, in the manner described, between pin and engaging aperture (or apertures) any changes in operating characteristics of the microswitches as a result, for example, of fatigue, have no effect on the datum, and this is of course a major operational advantage. A certain wear in the abutting action of pin and aperture may be expected, of course, but the loading can be made so small by suitable proportioning of the parts that no appreciable shift calling for readjustment is likely to take place over long periods of use.

It will be noted in the drawing that the sprocket teeth T1 and T2 (there is also T3 but this is not visible) corresponding to the spacing between the apertures in plate 20 have been marked and that the chart sprocket holes correspondingly spaced have also been marked by a ring such as "0." The object of the references is to facilitate the correct fitting of the chart to the sprockets.

Although the user would find the marked teeth of assistance with a plain chart, in that he could himself mark the perforations corresponding to the marked teeth and use his marking for the purpose of re-recording in superposition to the first trace produced, he derives particular advantage from our invention by using a chart having a preprinted grid in which the registration between certain predetermined abscissa value and the marked hole has been accurately produced in the manufacture of the chart. With a preprinted chart it is easy to ensure that the marked hole corresponding to the abscissa value required as the origin is in engagement with the correct marked tooth. Engagement of the wrong marked tooth would cause such a large error that the operator would immediately be aware of it.

A description of the mechanism within enclosure 9 is not essential to a proper understanding of a practical embodiment of the invention and no constructional details need be given. Broadly speaking, there will be included a mechanical function generator (gratings are usually rotated in accordance with a cosecant function) and a grating changer. The actual disposition of the parts may vary greatly in practice and the provision of an enclosure is purely symbolical.

Similarly, programmer 10 is intended to represent the electrical and electromechanical coordination of several machine functions besides those specifically referred to. The controlling of motor 5 and electromagnet 23 by the programmer would normally be arranged through well known relay means providing all the necessary interlocks required for the reliable operation of a practical instrument. A programmer need not be a self-contained unit, of course, and the parts may well be distributed throughout the instrument.

What we claim is:

1. A recording apparatus comprising a support for holding a recording chart in repeatable register, a holder for a marking device for co-operating with said chart in producing a trace thereon, a mechanism for causing relative movement between said support and said holder in a first direction to represent a first variable, means for displacing said holder in a second intersecting direction to represent a second variable, drive means for actuating said mechanism in response to said first variable, a coupling interposed between said drive means and said mechanism and having a driving and a driven part, the coupling enabling independent positional adjustment of the first variable and the mechanism, positive mechanical interference means having two co-operating faces, one movable with the driving part and the other movable with the driven part, and programming means responsive to the value of said first variable and operatively connected to said coupling, said coupling being of such constructions as to enable the co-operating faces to be brought almost into interference when said driving and driven parts are brought almost into a predetermined spatial relationship under the control of said programming means, so that the actual predetermined spatial relationship may be repeatedly established by the abutment of said co-operating faces when brought into actual interference by the take up in the drive with an accuracy limited in the main by the negligible wear in conveniently proportioned co-operating faces.

2. Apparatus as claimed in claim 1, wherein an additional means is provided for controllably interrupting said coupling to allow said co-operating faces to be kept out of interference with each other for the purpose of said positional adjustment.

3. Apparatus as claimed in claim 1, wherein said coupling is provided with a single take up position and means are included enabling the origin of travel of the movable member in said relative movement to be unequivocally set by virtue of the positive mechanical interference means following a positional adjustment.

4. Apparatus as claimed in claim 1, wherein said coupling is provided with a plurality of take up positions equally spaced and corresponding to equal discrete displacements of the movable member in said relative movement, and means are included enabling the origin of travel of the movable member to be unequivocally set correspondingly to any desired take up position.

5. Apparatus as claimed in claim 4, wherein the end of travel of the movable member may be made to occur at any desired position whether corresponding to a take up position or not.

6. Apparatus as claimed in claim 1, including first and second generating means stages actuatable by said drive means for generating said first variable in two consecutive ranges, wherein a synchronization break between said mechanism and said drive means may be made to occur at any convenient terminal value of the first generating means stage and restoration of synchronization may be made to occur where the start value of the second generating means stage coincides with said terminal value, an exact number of take up positions occurring between break and restoration, whereby a trace may be produced in two consecutive parts and the continuation of the trace following the first part is substantially free of shift along the scale of the movable member by virtue of the fact that the datum for the second part is invariably determined by the abutment of the co-operating faces of the mechanical interference means.

7. Apparatus as claimed in claim 1, wherein a manual control enables the coupling to be overridden.

8. Apparatus as claimed in claim 1, wherein the mechanical interference means is controlled, by electro-magnetic means, through the logic of the apparatus.

9. Apparatus as claimed in claim 1, wherein the mechanical interference means is adapted to establish a coupling between said driving and said driven part both in the forward and reverse directions of the drive.

10. Apparatus as claimed in claim 1, wherein the mechanical interference means comprises a pin, one portion of which is adapted to come into interference with a wall portion of an aperture in a plate.

11. Apparatus as claimed in claim 1, wherein said apparatus forms part of a spectrophotometer having first and second generating means stages for wavenumber or wavelength scanning actuatable by the drive means in two consecutive ranges and means are provided for disengaging the coupling between the drive means and the movable member at any convenient terminal value of the first generating means stage and for re-engaging said coupling at a start value of the second generating means stage identical with said terminal value, an exact number of take up positions occurring between disengagement and re-engagement of the coupling, whereby the trace may be produced in two consecutive parts and the continuation of the trace after the first part is substantially free of shift along the scale of the movable member by virtue of the fact that the datum for the second part is invariably determined by the abutment of the co-operating faces of the mechanical interference device.

12. A recording apparatus comprising sprocket means for advancing a perforated chart in a first direction in response to a first variable, drive means associated with said first variable for rotating said sprocket means, a holder for a marking device intended to co-operate with said chart for the formation of a trace thereon, means for displacing said holder in a second intersecting direction in response to a second variable, a coupling interposed between said drive means and said sprocket means and having a driving and a driven part, the coupling being provided to enable independent positional adjustment of the first variable and the sprocket means, positive mechanical interference means having two co-operating faces, one movable with the driving part and the other movable with the driven part, said coupling being of such construction as to enable the co-operating faces to be brought almost into interference when said driving part and said driven part are almost in a predetermined spatial relationship so that the actual predetermined spatial relationship may be repeatedly established by the abutment of said co-operating faces when brought into actual interference by the take up in the drive with an accuracy limited in the main by the negligible wear in conveniently proportioned faces, and programming means enabling interference of the co-operating faces to be pre-arranged in relation to the value of said first variable.

13. Apparatus as claimed in claim 12, wherein the coupling is provided with a plurality of equally spaced take up positions.

14. Apparatus as claimed in claim 13, wherein the take up positions are spaced to correspond to a whole number of sprocket teeth.

15. Apparatus as claimed in claim 12, wherein the drive means is adapted to cause a predetermined full angular travel of the sprocket means between limits defined by the programming means.

16. Apparatus as claimed in claim 15, wherein the programming means is adapted to set an intermediate limit for selectively defining a partial angular travel of the sprocket means.

17. Apparatus as claimed in claim 15, wherein the programming means is adapted to cause the drive to return to a start position at the end of travel after inhibiting the mechanical interference means.

18. Apparatus as claimed in claim 12, wherein sprocket teeth corresponding to the take up positions are marked for the convenience of the user in fitting the chart with any take up position as the origin.

References Cited

UNITED STATES PATENTS

| | | | |
|---|---|---|---|
| 1,050,872 | 1/1913 | Torney | 346—136 |
| 2,948,185 | 8/1960 | Ward et al. | 88—14 |
| 3,304,831 | 2/1967 | Ashley | 346—136 X |

RICHARD B. WILKINSON, *Primary Examiner.*

JOSEPH W. HARTARY, *Assistant Examiner.*